Dec. 7, 1926.

M. KIMMERLING 1,609,514

TIRE STRIPPING MACHINE

Filed Jan. 8, 1926

Inventor
M. Kimmerling

By Clarence A. O'Brien
Attorney

Patented Dec. 7, 1926.

1,609,514

UNITED STATES PATENT OFFICE.

MICHEL KIMMERLING, OF BIRMINGHAM, ALABAMA.

TIRE-STRIPPING MACHINE.

Application filed January 8, 1926. Serial No. 80,118.

This invention relates to tire stripping machines particularly adapted for stripping solid rubber tires from their carrying rims and has for its primary object to substantially improve and simplify over machines of this type previously used and patented.

In the attainment of this end, I provide highly novel means whereby a tire carrying rim may be readily secured to the machine and adapted to be slowly rotated together with a rapid reciprocating stripping knife that is adapted to cut the tire from the rim in a saw-like manner, for thus accomplishing a uniform and smooth stripping of the tire from the rim.

With the above and other objects in view as the nature of the invention will be better understood, the same comprises the novel form, combination and arrangement of parts hereinafter more fully described and shown in the accompanying drawings and claimed.

In the drawing wherein like reference characters indicate corresponding parts throughout the several views:—

Figure 1:
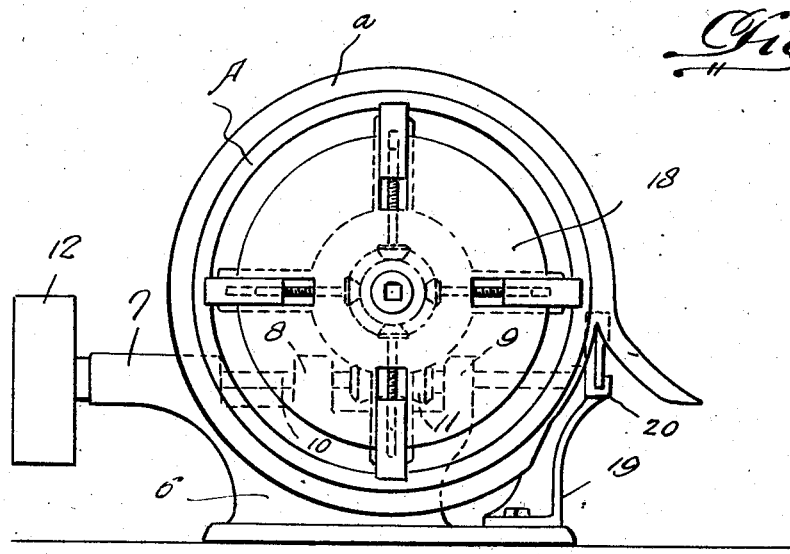
Figure 1 is a front elevation of my improved machine.

Now having particular reference to the drawing, my novel machine constitutes the provision of a rectangular shaped base 5, formed upon the top side of which and extending vertically from the base in parallel spaced relation with the rear edge thereof, is a plate-like standard 6, the upper edge is formed with straight spaced alined bearings 7, 8 and 9, journaled through which is a horizontal shaft 10 that is provided between the bearings 8 and 9 with a worm 11. One end of the shaft 10 is equipped with a belt pulley 12 while the opposite end thereof is equipped with a crank arm 13, Fig. 3.

The base 5 is further formed forward of the bearing plate 6 and in spaced transverse relation with a pair of bearing supporting standards 14—14 upon the upper end of which is formed a relatively elongated transversely extending shaft bearing sleeve 15. Journaled through this sleeve is a shaft 16, that carries at its inner end a worm gear 17 that is adapted for cooperation with the worm 11 of the shaft 10, Fig. 1.

Upon the forward end of the shaft 16 is a standard make universal chuck 18 for permitting of the securing of various sizes tire rims A to said end of the shaft 16 in concentric relation therewith.

Longitudinally adjustably secured to the machine base 5 at one side of the chuck 18, is a standard 19 that is offset outwardly at its upper end and carries a reciprocating knife blade guide 20, that may be moved toward or away from the tire carrying rim A, carried by the chuck for regulating the depth of the cut of the solid tire a upon the rim A, Fig. 1.

Figure 2:
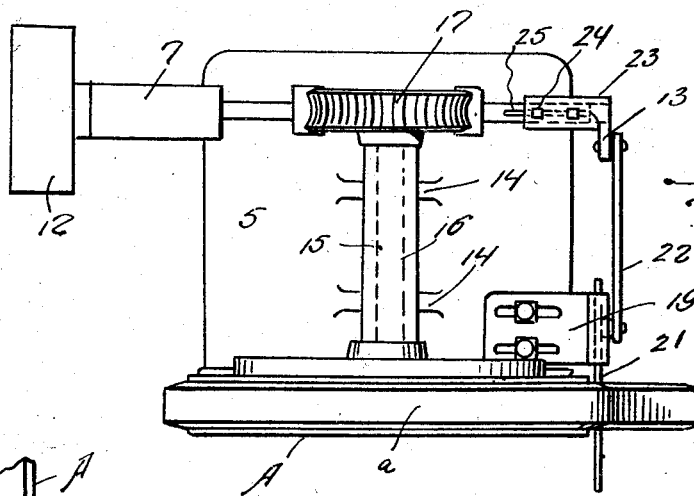
Fig. 2 is a top plan view thereof.
Figure 3:
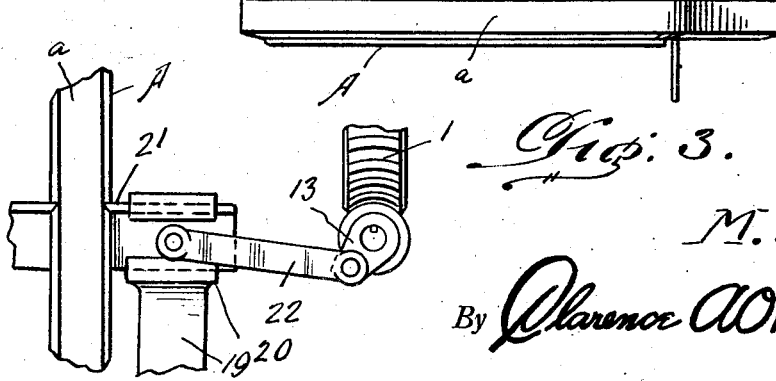
Fig. 3 is an enlarged fragmentary side elevation disclosing more clearly the mount for the stripping blade and its operating mechanism.

Rectilinearly slidable in the guide 20 in a direction parallel with the shaft 16 is a stripping blade 21 that is attached adjacent its rear end to the crank arm 13 of the shaft 10 through the medium of a connecting link 22, Figs. 2 and 3. In order that the crank 13 of said shaft may be adjusted in a manner consonant with the adjustment of the blade guide standard, said crank arm is formed upon its outer end with a sleeve 23 that is slidable upon the end of the shaft 10 and adapted to be rigidly secured thereto through the medium of suitable fasteners 24 that extends through alined openings in the sleeve and a slot 25 in said shaft.

It will be readily noted that the gear 17 upon the inner end of the chuck carrying shaft 16 is much larger than the gear 11 of the shaft 10 for obviously reducing the rotation of the chuck with respect to said shaft. During the slow movement of the chuck upon which is disposed the tire carrying rim shown in Figs. 1 and 2, the blade 21 will be rapidly reciprocated for stripping the tire from the rim in a smooth and rapid manner.

It will thus be seen that I have provided a highly novel, simple and efficient form of tire stripping machine that is well adapted for all of the purposes designated, and even though I have herein shown and described a particular embodiment of the invention, it is nevertheless to be understood that minor changes may be made herein without departing from the spirit and scope of the appended claims.

Having thus described my invention, what I claim as new and desire to secure by Letters Patent is:

1. In a tire stripping machine of the character described, a base, a horizontal shaft journaled upon the base, a second shaft also journaled upon the base above the first mentioned shaft and extending at right angles thereto, driving connections between the two shafts, a universal tire rim chuck upon the forward end of the last mentioned shaft, a rectilinearly movable stripping blade mounted upon the base in spaced relation with the periphery of said chuck, means interconnecting said first mentioned shaft and said blade respectively, whereby a rotation of the shaft will impart the rectilinear movement to the blade, and means upon the first mentioned shaft and blade carrier respectively in order that said blade may be disposed in adjusted position with respect to the chuck and the rim mounted thereon.

2. In a tire stripping machine of the class described, a base, a horizontal drive shaft mounted thereon, a driven shaft mounted on the base and disposed at right angles to the drive shaft, a driving connection between said shafts, a rim supporting chuck on the outer end of the driven shaft, a stripping blade, a support therefor adjustably mounted on the base adjacent the periphery of the chuck, a sleeve adjustably secured on the outer end of the drive shaft, and a connection between said sleeve and the blade for effecting reciprocatory movement of the blade simultaneous with the rotation of the shafts.

3. In a tire stripping machine, a base, a horizontal drive shaft mounted thereon, a driven shaft which is mounted on the base and disposed at right angles to the drive shaft, a worm and gear connection between the inner end of the drive shaft and the intermediate portion of the drive shaft, a rim supporting chuck carried on the outer end of the driven shaft, a vertical standard adjustably secured on the base adjacent the periphery of the chuck, an offset guide formed on the upper end of said standard, a stripping blade slidable in said guide, a sleeve adjustably secured on the outer end of the drive shaft, a crank formed on the outer end of said sleeve, and a connection between said crank and said stripping blade whereby the blade will be adapted for reciprocatory movement in said guide simultaneous with the rotation of said shafts.

In testimony whereof I affix my signature.

MICHEL KIMMERLING.